UNITED STATES PATENT OFFICE.

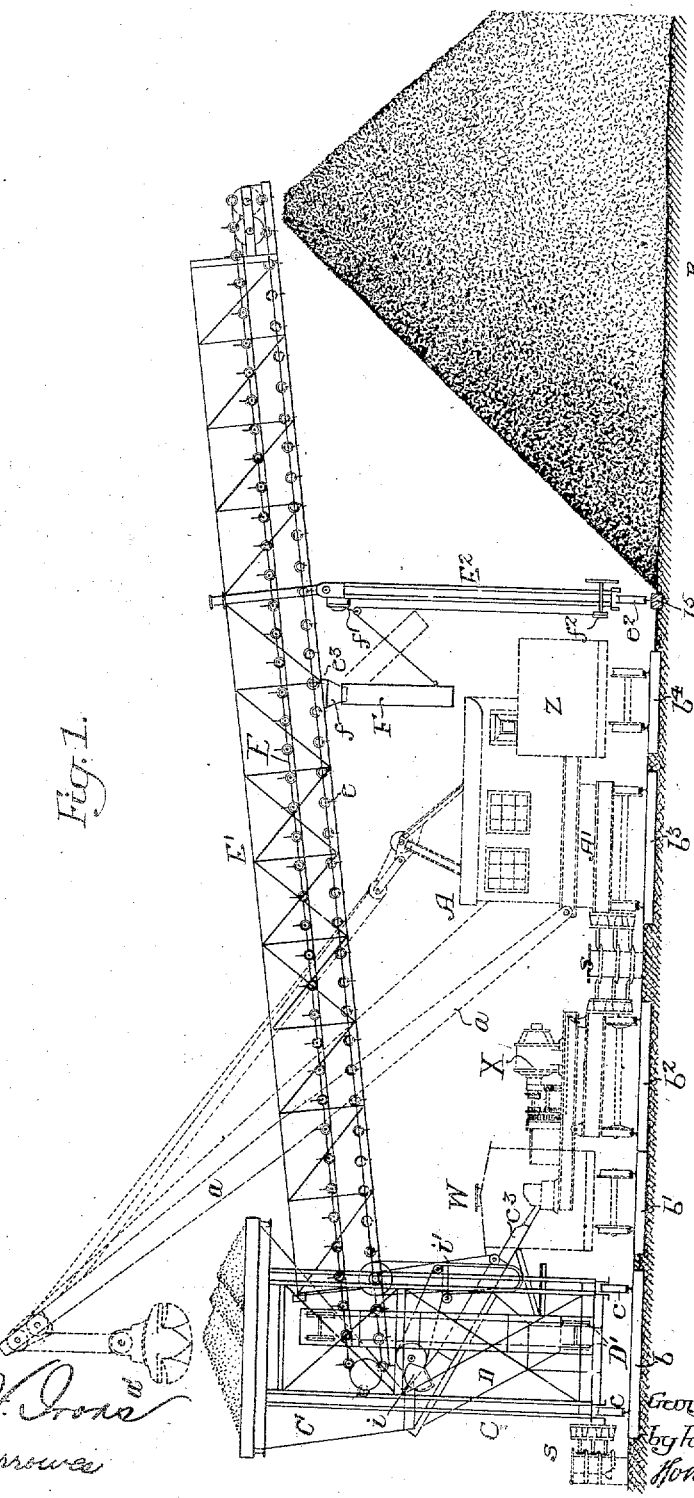

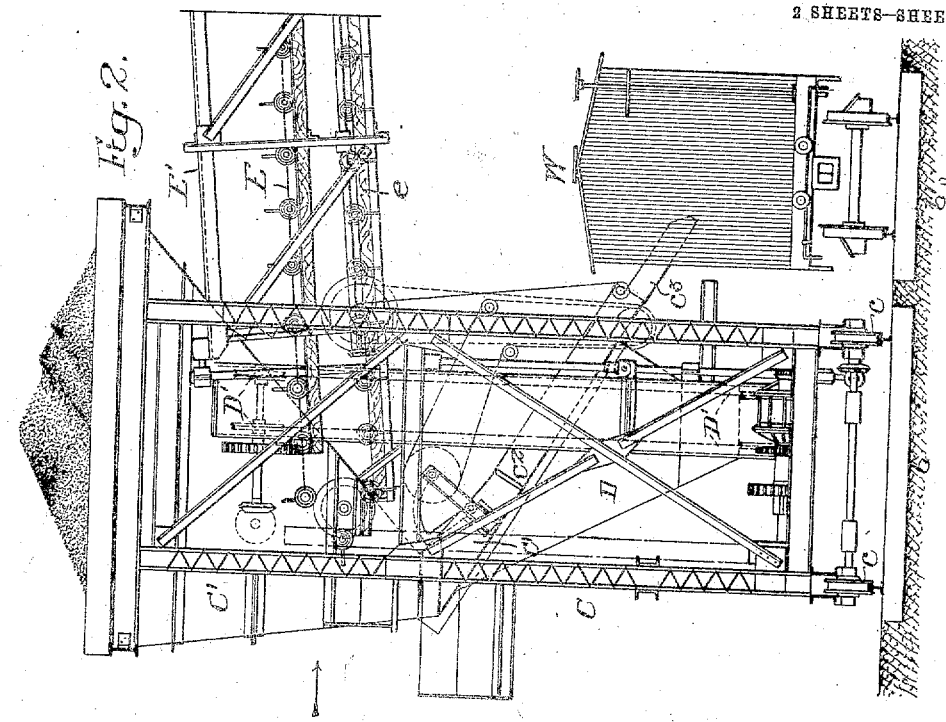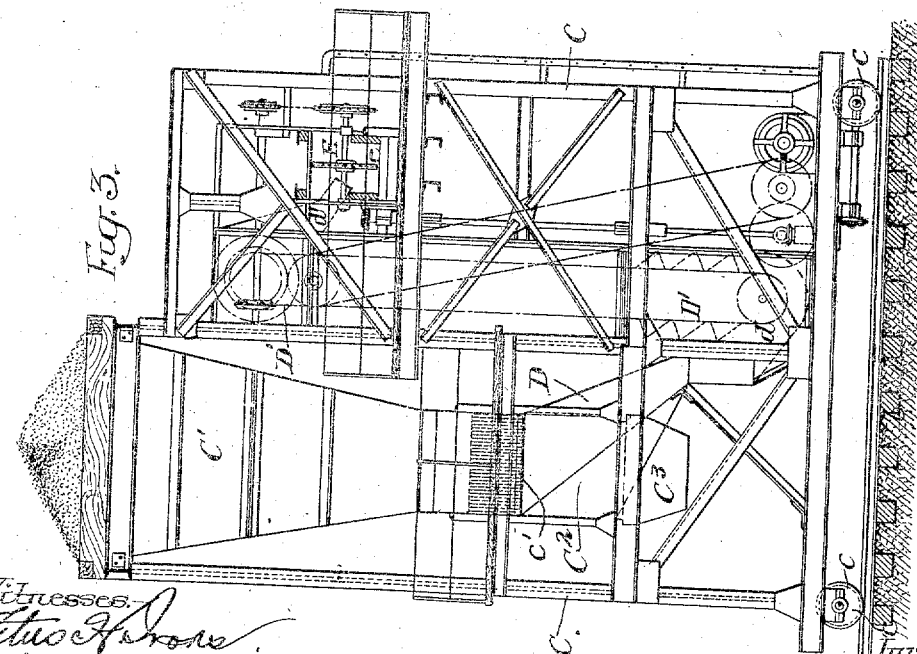

GEORGE E. TITCOMB, OF PHILADELPHIA, PENNSYLVANIA, ASSIGNOR TO THE J. M. DODGE COMPANY, OF NAUGATUCK, CONNECTICUT, A CORPORATION OF PENNSYLVANIA.

COAL-HANDLING APPARATUS.

983,659.  Specification of Letters Patent.  Patented Feb. 7, 1911.

Application filed April 3, 1909. Serial No. 487,618.

*To all whom it may concern:*

Be it known that I, GEORGE E. TITCOMB, a citizen of the United States, residing in Philadelphia, Pennsylvania, have invented certain Improvements in Coal-Handling Apparatus, of which the following is a specification.

My invention relates to certain improvements in apparatus for handling coal and like material, particularly delivering coal from a storage pile to a car, and the object of my invention is to so construct the apparatus that the coal can be readily delivered from the storage pile to a hopper at one side of the car, and to screen the coal as it passes from the hopper to the car, and to carry away and store the screenings.

This object I attain in the following manner, reference being had to the accompanying drawings, in which:—

Figure 1, is a side view illustrating my improved coal handling apparatus; Fig. 2, is an enlarged view of part of Fig. 1; and Fig. 3, is an end view looking in the direction of the arrow, Fig. 2.

In the present instance there is a piling floor from which a crane A transfers the coal to a hopper. There is a piling floor B for the screenings and there are five tracks $b$, $b'$, $b^2$, $b^3$ and $b^4$.

On the track $b$ is a tower C mounted on wheels $c$, and on this tower is the hopper C'. This hopper is made as clearly shown in Fig. 2, and has a chute $c'$ provided with a screen section $c^2$, made in any suitable manner, and this chute $c'$ connects with an adjustable chute $c^3$ which extends into the car W to be loaded and which is located on the track $b'$.

Directly under the chute $c'$ is a screenings hopper D, which communicates with the boot $d$ of the screenings elevator D'. This screenings elevator delivers the material to a chute $d'$, which discharges into the trough $e$ of the flight conveyer E. This flight conveyer is mounted on a truss structure E', which is supported at one end by the tower and at the opposite end by a braced frame E², having wheels $e^2$ mounted on a rail $b^5$. The outer end of this truss structure E' extends over the piling floor B for the screenings, so that the screenings as they pass from the hopper D are transferred through the elevator D' to the conveyer E, and by means of the flights of the said conveyer travel over the trough and discharge at the extreme end onto the pile of screenings already formed, as illustrated clearly in Fig. 1.

In some instances it may be desirable to discharge the screenings into a car and in this instance I provide a chute $f$ under the truss structure E', and in the trough $e$ of the conveyer is a door $e^3$ which can be opened by any suitable means when it is desired to discharge the screenings through the chute $f$. This chute is coupled to a pivoted tube F and is situated directly above the track $b^4$, so that a car run upon this track can receive a load of screenings through the chute F. A rope $f'$, leading from the chute around a pulley to a handled shaft $f^2$ can be used to regulate the position of the chute.

On the track $b^2$ is the box car loading apparatus X, which may be of any form desired, and which aids in directing the coal from the chute $c^3$ to any point within the car. This structure forms no part of my invention.

On the track $b^3$ is the truck A' and crane A which has a long boom $a$ from which is suspended the bucket $a'$ of the clam-shell type in the present instance. Operating ropes lead from this bucket to the hoisting mechanism of the crane and as this crane is self-propelled, it can be moved to any point on track $b^3$ desired.

It will be noticed that the tower C with its extended truss structure E' can be moved on its tracks, the crane A can be moved on its tracks and the car reloader X can be moved on its tracks parallel with the side of the screenings piling floor B, so that coal can be taken from any part of the main coal-storage piling floor and delivered to the hopper C', and from this hopper the coal can be discharged by operating the gate valve $i$ through the ordinary rope mechanism $i'$, so that it will discharge into the car W.

The box car loading apparatus X shown in outline in Fig. 1 can be used to distribute the coal within the car, and the coal will be screened before entering the car, the screenings being discharged through the above described mechanism to the piling floor B or the car Z on the track $b^4$.

In the present instance the mechanism of the tower, car loader and crane are electrically driven, and contact posts $s$ are mounted adjacent each track and contacts on the several elements make contact with the terminals on the posts—other means may be used, and the elements may be driven by means other than electricity.

I claim:—

1. The combination in a coal handling apparatus, of a series of tracks, a wheeled tower mounted on one of said tracks, a truss structure projecting from the tower and extending over the other tracks, a frame supporting the outer end of such truss structure and also mounted on wheels, a hopper in the tower, a chute leading from the hopper to a point at one side of the tower, a screen in the chute leading from the hopper, a screenings hopper below the screen in the chute, an elevator mounted on the tower, the screenings hopper communicating with the boot of said elevator, an endless conveyer mounted on the truss structure projecting from the tower, the elevator discharging into the trough of said conveyer and the conveyer discharging at the end of the truss structure beyond the tracks, whereby the screenings are carried away from the tower and discharged onto a piling floor.

2. The combination of a tower mounted on wheels, a truss structure projecting from the tower, a frame supporting the outer end of the truss structure and also supported on wheels, a coal hopper mounted in the upper portion of the tower, a chute leading from the hopper to one side of the tower, a track on one side of the tower for the accommodation of cars to be loaded, a track beyond the car track, a box car loading apparatus mounted on the last mentioned track, a screen in the chute leading from the coal hopper, a screenings hopper mounted under the screen, a screenings elevator communicating with the screenings hopper, an endless conveyer on the truss structure arranged to receive screenings from the elevator, a track upon which a car can be loaded, and a chute communicating with the trough of the endless conveyer and adapted to discharge screenings directly into the car.

3. The combination in a coal handling apparatus, of five tracks, a tower mounted on the first track, a hopper in the upper portion of the tower, a chute having a screen therein, said chute leading from said hopper to one side of the tower, a screenings hopper under said screen, a screenings elevator communicating with the screenings hopper, a truss structure projecting from the tower and over the tracks, an endless conveyer on the truss structure communicating at one end with the screenings elevator, the car to be loaded being mounted on the second track, a box car loading apparatus being mounted on the third track, a crane mounted on the fourth track and having a boom from which a bucket is suspended, so that coal can be transferred from a piling floor to the hopper carried by the tower, and a car on the fifth track for receiving screenings from the overhead truss structure, the whole combined and operating substantially as described.

In testimony whereof, I have signed my name to this specification, in the presence of two subscribing witnesses.

GEORGE E. TITCOMB.

Witnesses:
WM. E. SHUPE.
WM. A. BARR.

---

Correction in Letters Patent No. 983,659.

It is hereby certified that in Letters Patent No. 983,659, granted February 7, 1911, upon the application of George E. Titcomb, of Philadelphia, Pennsylvania, for an improvement in "Coal-Handling Apparatus" the State of incorporation of the assignee was erroneously given as "Pennsylvania," whereas it should have been given as *Connecticut;* and that the said Letters Patent should be read with this correction therein that the same may conform to the record of the case in the Patent Office.

Signed and sealed this 14th day of March, A. D., 1911.

[SEAL.]

E. B. MOORE,
*Commissioner of Patents.* used, and the elements may be driven by means other than electricity.

I claim:—

1. The combination in a coal handling apparatus, of a series of tracks, a wheeled tower mounted on one of said tracks, a truss structure projecting from the tower and extending over the other tracks, a frame supporting the outer end of such truss structure and also mounted on wheels, a hopper in the tower, a chute leading from the hopper to a point at one side of the tower, a screen in the chute leading from the hopper, a screenings hopper below the screen in the chute, an elevator mounted on the tower, the screenings hopper communicating with the boot of said elevator, an endless conveyer mounted on the truss structure projecting from the tower, the elevator discharging into the trough of said conveyer and the conveyer discharging at the end of the truss structure beyond the tracks, whereby the screenings are carried away from the tower and discharged onto a piling floor.

2. The combination of a tower mounted on wheels, a truss structure projecting from the tower, a frame supporting the outer end of the truss structure and also supported on wheels, a coal hopper mounted in the upper portion of the tower, a chute leading from the hopper to one side of the tower, a track on one side of the tower for the accommodation of cars to be loaded, a track beyond the car track, a box car loading apparatus mounted on the last mentioned track, a screen in the chute leading from the coal hopper, a screenings hopper mounted under the screen, a screenings elevator communicating with the screenings hopper, an endless conveyer on the truss structure arranged to receive screenings from the elevator, a track upon which a car can be loaded, and a chute communicating with the trough of the endless conveyer and adapted to discharge screenings directly into the car.

3. The combination in a coal handling apparatus, of five tracks, a tower mounted on the first track, a hopper in the upper portion of the tower, a chute having a screen therein, said chute leading from said hopper to one side of the tower, a screenings hopper under said screen, a screenings elevator communicating with the screenings hopper, a truss structure projecting from the tower and over the tracks, an endless conveyer on the truss structure communicating at one end with the screenings elevator, the car to be loaded being mounted on the second track, a box car loading apparatus being mounted on the third track, a crane mounted on the fourth track and having a boom from which a bucket is suspended, so that coal can be transferred from a piling floor to the hopper carried by the tower, and a car on the fifth track for receiving screenings from the overhead truss structure, the whole combined and operating substantially as described.

In testimony whereof, I have signed my name to this specification, in the presence of two subscribing witnesses.

GEORGE E. TITCOMB.

Witnesses:
WM. E. SHUPE.
WM. A. BARR.

---

Correction in Letters Patent No. 983,659.

It is hereby certified that in Letters Patent No. 983,659, granted February 7, 1911, upon the application of George E. Titcomb, of Philadelphia, Pennsylvania, for an improvement in "Coal-Handling Apparatus" the State of incorporation of the assignee was erroneously given as "Pennsylvania," whereas it should have been given as *Connecticut;* and that the said Letters Patent should be read with this correction therein that the same may conform to the record of the case in the Patent Office.

Signed and sealed this 14th day of March, A. D., 1911.

[SEAL.]

E. B. MOORE,
*Commissioner of Patents.*

Correction in Letters Patent No. 983,659.

It is hereby certified that in Letters Patent No. 983,659, granted February 7, 1911, upon the application of George E. Titcomb, of Philadelphia, Pennsylvania, for an improvement in "Coal-Handling Apparatus" the State of incorporation of the assignee was erroneously given as "Pennsylvania," whereas it should have been given as *Connecticut;* and that the said Letters Patent should be read with this correction therein that the same may conform to the record of the case in the Patent Office.

Signed and sealed this 14th day of March, A. D., 1911.

[SEAL.]

E. B. MOORE,

*Commissioner of Patents.*